(12) United States Patent
Roeglinger

(10) Patent No.: US 12,348,916 B2
(45) Date of Patent: Jul. 1, 2025

(54) MEASUREMENT CLOUD SETUP FOR COUPLING MEASUREMENT DEVICE SETTINGS ACROSS MULTIPLE INSTRUMENTS AND/OR MEASUREMENT SITES AND CORRESPONDING HANDLING METHOD

(71) Applicant: Rohde & Schwarz GmbH & Co. KG, Munich (DE)

(72) Inventor: Sebastian Roeglinger, Pfaffenhofen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/680,173

(22) Filed: Nov. 11, 2019

(65) Prior Publication Data
US 2020/0396294 A1    Dec. 17, 2020

(30) Foreign Application Priority Data
Jun. 13, 2019  (EP) ..................... 19179849
Jul. 19, 2019  (EP) ..................... 19187186

(51) Int. Cl.
*H04Q 9/00*  (2006.01)
*G06F 21/40*  (2013.01)
(Continued)

(52) U.S. Cl.
CPC .............. *H04Q 9/00* (2013.01); *G06F 21/40* (2013.01); *G06F 21/629* (2013.01);
(Continued)

(58) Field of Classification Search
CPC . H04L 67/125; H04L 41/0893; H04L 43/065; H04L 41/0813; H04L 41/22;
(Continued)

(56) References Cited

U.S. PATENT DOCUMENTS 7,797,147 B2 *  9/2010  Vinberg .............. H04L 41/5019
                                              703/22
9,021,017 B2 *  4/2015  Bowers ............... H04L 41/0813
                                              709/203
(Continued)

FOREIGN PATENT DOCUMENTS

DE      10018651 A1   12/2001
WO     2006076639 A1    7/2006
WO     2016151096 A1    9/2016

OTHER PUBLICATIONS

S. A. Rust, "Implementing VXIplug&play instrument drivers," Conference Record Autotestcon '95. 'Systems Readiness: Test Technology for the 21st Century', 1995, pp. 268-276, doi: 10.1109/Autest.1995.522683. (Year: 1995).*

(Continued)

*Primary Examiner* — Patrice L Winder
(74) *Attorney, Agent, or Firm* — DITTHAVONG, STEINER & MLOTKOWSK

(57) ABSTRACT

A measurement cloud setup for coupling measurement device settings across multiple instruments and/or measurement sites is provided. The measurement cloud setup comprises an interface, through which the respective instruments and/or measurement sites being part of the coupling are defined.

16 Claims, 6 Drawing Sheets

(51) Int. Cl.

| | |
|---|---|
| *G06F 21/62* | (2013.01) |
| *H04L 9/40* | (2022.01) |
| *H04L 12/46* | (2006.01) |
| *H04L 41/042* | (2022.01) |
| *H04L 41/0813* | (2022.01) |
| *H04L 41/0893* | (2022.01) |
| *H04L 41/22* | (2022.01) |
| *H04L 43/065* | (2022.01) |
| *H04L 67/025* | (2022.01) |
| *H04L 67/125* | (2022.01) |
| *H04W 12/06* | (2021.01) |
| *H04L 41/0895* | (2022.01) |

(52) U.S. Cl.
CPC ........ *H04L 12/4675* (2013.01); *H04L 41/042* (2013.01); *H04L 41/0813* (2013.01); *H04L 41/0893* (2013.01); *H04L 41/22* (2013.01); *H04L 43/065* (2013.01); *H04L 63/0272* (2013.01); *H04L 63/0869* (2013.01); *H04L 67/025* (2013.01); *H04L 67/125* (2013.01); *H04W 12/06* (2013.01); *H04L 41/0895* (2022.05)

(58) Field of Classification Search
CPC ............... H04L 12/4675; H04L 41/042; H04L 63/0272; H04L 63/0869; H04L 67/025; H04L 63/10; H04L 63/102; H04L 63/105; G06F 21/629; G06F 21/40; G06F 21/62; G06F 21/41; H04W 12/06
See application file for complete search history.

(56) References Cited

U.S. PATENT DOCUMENTS

| | | | | |
|---|---|---|---|---|
| 9,729,945 | B2* | 8/2017 | Schultz | H04Q 9/00 |
| 9,803,472 | B2* | 10/2017 | Weatherhead | H04L 67/10 |
| 9,917,903 | B2* | 3/2018 | Clernon | H04L 41/0806 |
| 9,960,980 | B2* | 5/2018 | Wilson | H04L 67/18 |
| 10,178,638 | B1* | 1/2019 | Stamatakis | H04W 56/002 |
| 10,234,155 | B2* | 3/2019 | Rafiq | G05D 23/1931 |
| 10,352,299 | B2* | 7/2019 | Booth | F03D 7/042 |
| 10,551,226 | B2* | 2/2020 | Luo | G01D 18/00 |
| 10,601,634 | B2* | 3/2020 | Hayashi | H04L 67/025 |
| 10,642,598 | B2* | 5/2020 | Duraisingh | H04L 67/1095 |
| 10,712,738 | B2* | 7/2020 | Cella | G05B 19/41845 |
| 10,756,974 | B2* | 8/2020 | Malaspina | H04L 41/0843 |
| 11,019,490 | B2* | 5/2021 | Yang | H04L 63/0492 |
| 11,356,440 | B2* | 6/2022 | Mangalvedkar | H04W 4/50 |
| 11,368,534 | B2* | 6/2022 | Duraisingh | H04L 41/0816 |
| 2003/0036871 | A1 | 2/2003 | Fuller, III et al. | |
| 2004/0034478 | A1* | 2/2004 | Yung | G05B 23/0264 702/19 |
| 2007/0158335 | A1* | 7/2007 | Mansbery | H05B 6/6435 219/505 |
| 2009/0153559 | A1* | 6/2009 | Dees | G01R 23/18 345/440.1 |
| 2010/0198905 | A1* | 8/2010 | McKay | H04L 67/125 709/203 |
| 2011/0161402 | A1* | 6/2011 | Anderson | H04L 43/0817 709/203 |
| 2012/0036947 | A1* | 2/2012 | Dobyns | G01R 23/16 73/866.3 |
| 2013/0325924 | A1* | 12/2013 | Moshfeghi | H04L 67/12 709/203 |
| 2014/0188423 | A1 | 7/2014 | Messinger et al. | |
| 2014/0279443 | A1* | 9/2014 | Neeley | H04N 23/80 702/188 |
| 2015/0346063 | A1 | 12/2015 | Braunstorfinger | |
| 2016/0061476 | A1* | 3/2016 | Schultz | F24F 11/30 700/276 |
| 2016/0209069 | A1* | 7/2016 | Rafiq | G05D 23/1934 |
| 2016/0333855 | A1* | 11/2016 | Lund | G05B 13/041 |
| 2017/0060911 | A1* | 3/2017 | Loscalzo | G06F 16/258 |
| 2017/0169640 | A1* | 6/2017 | Britt | H04L 67/125 |
| 2017/0244600 | A1* | 8/2017 | Hussein | H04L 67/327 |
| 2017/0366988 | A1* | 12/2017 | Stamatakis | H04L 67/125 |
| 2017/0373907 | A1* | 12/2017 | Tan | H04L 5/0091 |
| 2018/0137424 | A1* | 5/2018 | Gabaldon Royval | G06N 5/022 |
| 2018/0203959 | A1* | 7/2018 | Refsnaes | G06F 30/23 |
| 2018/0278607 | A1* | 9/2018 | Loladia | H04L 63/0876 |
| 2018/0306609 | A1* | 10/2018 | Agarwal | H04L 67/12 |
| 2018/0309818 | A1* | 10/2018 | Park | H04L 43/08 |
| 2019/0095517 | A1* | 3/2019 | Park | G06F 16/2379 |
| 2019/0098113 | A1* | 3/2019 | Park | H04L 67/10 |
| 2019/0171187 | A1* | 6/2019 | Cella | G05B 23/0221 |
| 2019/0242730 | A1* | 8/2019 | Croke | H03M 1/00 |
| 2019/0260831 | A1* | 8/2019 | Milev | H04L 67/125 |
| 2019/0272495 | A1* | 9/2019 | Moeller | G06Q 10/083 |
| 2019/0373062 | A1* | 12/2019 | Kozawa | H04L 12/4633 |
| 2019/0392457 | A1* | 12/2019 | Kuntagod | H04L 67/12 |
| 2020/0073419 | A1* | 3/2020 | Pickard | G05D 23/1934 |
| 2020/0120160 | A1* | 4/2020 | Estes | G06F 9/30 |
| 2020/0150637 | A1* | 5/2020 | Yates | G05B 23/0243 |
| 2020/0167652 | A1* | 5/2020 | Huang | G06N 3/0427 |
| 2020/0195716 | A1* | 6/2020 | Allsbrook | H04L 67/12 |

OTHER PUBLICATIONS

J. Mueller and R. Oblad, "Architecture drives test system standards," in IEEE Spectrum, vol. 37, No. 9, pp. 68-73, Sep. 2000, doi: 10.1109/6.866287. (Year: 2000).*

D. du Boulay et al., "Portal Services for Collaborative Remote Instrument Control, Monitoring and Data Access," Third IEEE International Conference on e-Science and Grid Computing (e-Science 2007), 2007, pp. 328-335, doi: 10.1109/E-Science.2007.60. (Year: 2007).*

D. du Boulay et al., "Remote instrument control with CIMA Web services and Web 2.0 technology," 2007 2nd International Conference on Digital Information Management, 2007, pp. 768-773, doi: 10.1109/ICDIM.2007.4444317. (Year: 2007).*

M. Yuriyama and T. Kushida, "Sensor-Cloud Infrastructure—Physical Sensor Management with Virtualized Sensors on Cloud Computing," 2010 13th International Conference on Network-Based Information Systems, 2010, pp. 1-8, doi: 10.1109/NBIS.2010. 32 (Year: 2010).*

R. Di Lauro, F. Lucarelli and R. Montella, "SlaaS—Sensing Instrument as a Service Using Cloud Computing to Turn Physical Instrument into Ubiquitous Service," 2012 IEEE 10th International Symposium on Parallel and Distributed Processing with Applications, 2012, pp. 861-862 (Year: 2012).*

U. Hernández-Jayo and J. Garcia-Zubia, "Reconfigurable electronics remote lab from the experiments and instruments point of view," 2012 Frontiers in Education Conference Proceedings, 2012, pp. 1-6, doi: 10.1109/FIE.2012.6462275. (Year: 2012).*

A. Maiti and C. K. Maiti, "Development of remote laboratories using cloud architecture with web instrumentation," 2013 10th International Conference on Remote Engineering and Virtual Instrumentation (REV), 2013, pp. 1-4, doi: 10.1109/REV.2013.6502902. (Year: 2013).*

Office Action for related European Patent Application No. 19 187 186.2-1215, dated May 6, 2021, 8 pages.

* cited by examiner

MEASUREMENT CLOUD SETUP FOR COUPLING MEASUREMENT DEVICE SETTINGS ACROSS MULTIPLE INSTRUMENTS AND/OR MEASUREMENT SITES AND CORRESPONDING HANDLING METHOD

PRIORITY

This application claims priority of the European patent applications EP 19 187 186.2 filed on Jul. 19, 2019, and EP 19 179 849.5 filed on Jun. 13, 2019, which is incorporated by reference herewith.

FIELD OF THE INVENTION

The invention relates to a measurement cloud setup for coupling measurement device settings across multiple instruments and/or measurement sites and a method for handling such a measurement cloud setup.

BACKGROUND OF THE INVENTION

Generally, in times of an increasing number of measurement instruments and measurement sites being distant from one another, there is a growing need of a measurement cloud setup for coupling measurement device settings across multiple instruments and/or measurement sites and a method for handling such a measurement cloud setup in order to ensure highly efficient measurements.

Unfortunately, neither a measurement cloud setup for coupling measurement device settings across multiple instruments and/or measurement sites nor a method for handling a measurement cloud setup for coupling measurement device settings across multiple instruments and/or measurement sites is known.

Accordingly, there is a need to provide an over-the-air measurement chamber and an over-the-air measurement method in order to allow for performing measurements, especially measurements regarding wireless connectivity capabilities under different temperature conditions, with respect to a device under test in a flexible manner, thereby ensuring a high accuracy and efficiency of the measurement.

SUMMARY OF THE INVENTION

According to a first aspect of the invention, a measurement cloud setup for coupling measurement device settings across multiple instruments and/or measurement sites is provided. The measurement cloud setup comprises an interface, through which the respective instruments and/or measurement sites being part of the coupling are defined. Advantageously, for instance, a high efficiency can ensured with special respect to measurement instruments and/or measurement sites being distant from one another.

In this context, it is noted that the measurement cloud setup may especially comprise the multiple instruments and/or measurement sites.

According to a first preferred implementation form of the first aspect of the invention, the respective instruments and/or measurement sites being part of the coupling are defined by a user. Advantageously, for example, a user can directly control the setup.

According to a second preferred implementation form of the first aspect of the invention, the interface comprises at least one of a controller, a management software, a cloud service, or any combination thereof. Advantageously, for instance, the interface may allow for an efficient management of the setup.

According to a further preferred implementation form of the first aspect of the invention, all members of the coupling are provided with instructions to inform the respective cloud of any setting changes. Advantageously, for instance, efficiency can further be increased.

Alternatively, it is noted that all members of the coupling may provide instructions to inform the respective cloud of any setting changes.

It is further noted that the setting changes especially relate to any setting change with respect to the instruments and/or the measurement sites.

According to a further preferred implementation form of the first aspect of the invention, the interface is configured to receive a changed setting. Advantageously, for example, a setting change can be received and processed in a highly efficient manner.

In this context, it is noted that said changed setting may especially be inputted by a user.

According to a further preferred implementation form of the first aspect of the invention, the interface is configured to send instructions to each coupled instrument and/or measurement site to take the respective new setting. Advantageously, for instance, efficiency can further be increased.

According to a further preferred implementation form of the first aspect of the invention, the coupled instruments and/or measurement sites are configured to receive and implement a setting change. Advantageously, for example, setting changes can be implemented in a highly efficient manner.

According to a further preferred implementation form of the first aspect of the invention, the coupled instruments and/or measurement sites are configured to receive and implement a setting change by providing permission to the interface to make the setting change. Advantageously, for instance, efficiency can further be increased.

According to a further preferred implementation form of the first aspect of the invention, the coupled instruments and/or measurement sites are configured to send a response to the respective cloud stating a certain status. Advantageously, for example, a status can be detected in a highly efficient manner.

According to a further preferred implementation form of the first aspect of the invention, the certain status comprises at least one of an okay, a not-okay, an acknowledgment, or a non-acknowledgment. Advantageously, for instance, complexity can be reduced, thereby increasing efficiency.

According to a further preferred implementation form of the first aspect of the invention, groups of settings to be coupled are defined such that not all settings are propagated. Advantageously, the interface may especially be configured to define said groups of settings.

According to a further preferred implementation form of the first aspect of the invention, IP (Internet Protocol) address changes are not propagated across the respective cloud. Advantageously, for instance, simplicity of configuration can be increased, which leads to an increased efficiency.

According to a further preferred implementation form of the first aspect of the invention, groups of settings comprise defined offsets for specific settings. Advantageously, for example, complexity can be reduced, thereby increasing efficiency.

According to a further preferred implementation form of the first aspect of the invention, the defined offsets comprise at least a frequency offset. Advantageously, for instance, efficiency can further be increased.

According to a second aspect of the invention, a method for handling a measurement cloud setup for coupling measurement device settings across multiple instruments and/or measurement sites is provided. The method comprises the step of defining the respective instruments and/or measurement sites as being part of the coupling through an interface of the measurement cloud setup. Advantageously, for instance, a high efficiency can ensured with special respect to measurement instruments and/or measurement sites being distant from one another.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Figure 1:
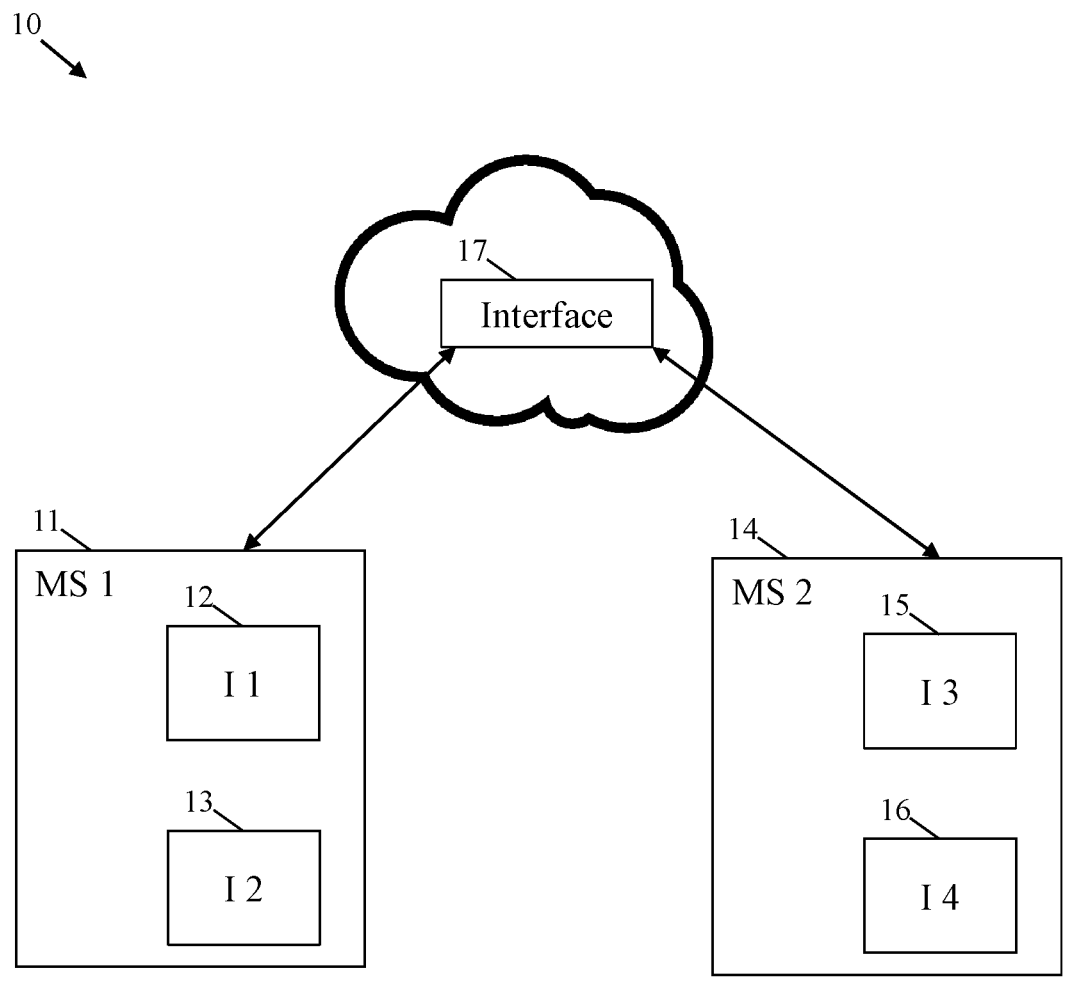
FIG. 1 shows an exemplary embodiment of the first aspect of the invention.

With respect to FIG. 1, a block diagram of an exemplary embodiment of a measurement cloud setup 10 for coupling measurement device settings across multiple instruments 12, 13, 15, 16 and/or measurement sites 11, 14 is shown.

According to FIG. 1, the measurement cloud setup 10 comprises a first measurement site 11 comprising a first instrument 12 and a second instrument 13, a second measurement site 14 comprising a third instrument 15 and a fourth instrument 16, and an interface 17, through which the respective instruments and/or measurement sites being part of the coupling are defined especially by a user.

In this context, it is noted that the interface 17 may especially comprise at least one of a controller, a management software, a cloud service, or any combination thereof.

Furthermore, all members 11, 12, 13, 14, 15, 16 of the coupling are provided with instructions to inform the respective cloud of any setting changes especially with the aid of the interface 17.

Moreover, it is noted that the interface 17 may be configured to receive a changed setting and to send instructions to each coupled instrument 12, 13, 15, 16 and/or measurement site 11, 14 to take the respective new setting.

Additionally or alternatively, the coupled instruments 12, 13, 15, 16 and/or measurement sites 11, 14 may especially be configured to receive and implement a setting change.

Furthermore, the coupled instruments 12, 13, 15, 16 and/or measurement sites 11, 14 may especially be configured to receive and implement a setting change by providing permission to the interface 17 to make the setting change.

In addition to this or as an alternative, the coupled instruments 12, 13, 15, 16 and/or measurement sites 11, 14 may especially be configured to send a response to the respective cloud stating a certain status.

In this context, the certain status may preferably comprise at least one of an okay, a not-okay, an acknowledgment, or a non-acknowledgment.

It might be particularly advantageous if groups of settings to be coupled are defined such that not all settings are propagated.

Furthermore, IP address changes may preferably not be propagated across the respective cloud.

With respect to the groups of settings, it is noted that the groups of settings may preferably comprise defined offsets for specific settings.

In this context, it is further noted that the defined offsets may especially comprise at least a frequency offset.

Now, an exemplary use case with respect to the measurement cloud setup 10 according to FIG. 1 is described in the following.

Exemplarily, a user changes a setting with respect to the third instrument 15 of the second measurement site 14. Accordingly, all other instruments, exemplarily the first instrument 12 and the second instrument 13 of the first measurement site 11, and the fourth instrument 16 of the second measurement site 14, take this change.

In other words, all coupled instruments and/or measurement sites are automatically updated with respect to a setting change. It is further noted that the above-mentioned cloud service may especially comprise a dashboard preferably for displaying the respective settings and/or the respective measurements results.

With respect to the dashboard, it is noted that the dashboard may especially be a measurement dashboard for a measurement site. In this context, a measurement site may be defined of more than one measurement instrument.

Furthermore, it may be created access on the cloud or cloud service, respectively, to said measurement site, but especially not other measurement sites.

It might be particularly advantageous if said access comprises or is a web-based dashboard allowing restricted access to multiple authenticated users. Said users may be controlled and/or restricted by the respective administrator of the measurement site.

It is noted that in this manner, direct network access to the site is advantageously not required. Further advantageously, a software on a respective remote user's computer may preferably be a password-based web interface for user management.

Moreover, said web-based dashboard may be configured to show at least one of the respective measurement setup, the respective measurement displays, measurement data belonging to the respective measurement site, or any combination thereof.

In accordance with the invention, it is additionally noted that the instruments 12, 13, 15, 16 and/or the measurement sites 11, 14 can be distant from each other.

In addition to this, it is noted that the invention allows for an accelerated operation because of all settings of the coupled instruments and/or measurement sites can be updated automatically.

Further advantageously, sources of errors can significantly be reduced because instruments and/or measurement sites cannot differently be configured in an erroneous manner.

As a further advantage, especially due to the cloud service, instruments and/or measurement sites can be coupled in a simple and highly efficient manner.

In addition to this, the inventions provides the advantage that IP addresses or the like have not to be configured, which further increases efficiency.

Again, with respect to the cloud service, it is noted that the cloud service especially allows for a synchronization of the respective settings between the instruments and/or the measurement sites.

Furthermore, the cloud service may especially be configured to translate the settings with respect to available instruments and/or measurement sites. Additionally, the cloud service may especially comprise a translation logic for translating the settings.

In this context, it might be particularly advantageous that the translation logic can be updated in a simple and highly efficient manner.

In addition to this, with respect to the instruments and/or the measurement sites, it is noted that no updates of the instruments and/or the measurement sites may be needed, even in the case that new instruments and/or measurement sites should be supported.

With respect to the first aspect of the invention, it is generally noted that it might be particularly advantageous to provide a cloud-based measurement platform for identifying a device, especially a measurement device or a platform device, a connecting the device with a device profile in a measurement site.

Said cloud-based measurement platform may comprise at least one measurement site comprising at least one device profile, especially at least one measurement device profile. The device profile may comprise at least configurations and/or settings. Additionally or alternatively, the device profile may comprise particular data, waveforms, scripts, saved settings, current configuration, or any combination thereof. Furthermore, the device may comprise or be a signal analyzer or a signal generator.

Moreover, the cloud-based measurement platform may comprise a device to be associated with the at least one measurement site.

The respective cloud or a cloud service, respectively, of the cloud-based measurement platform may especially be configured to authenticate devices, wherein the respective authentication preferably links the respective device with the corresponding measurement site and the profile of the respective device in the corresponding measurement site. In this context, especially with respect to said authentication, an optical code, preferably a QR code, may be scanned. Additionally or alternatively, a dongle, preferably an USB (Universal Serial Bus) dongle, may provide the respective key especially for said authentication.

With respect to the device, it is noted that the device may be configured to communicate with the cloud or the cloud service, respectively. In this context, the cloud or the cloud service, respectively, may be configured to provide the desired or correct device profile, especially measurement device profile.

With respect to the above-mentioned authentication, it is noted that the authentication may be mediated by a smartphone application in combination with at least one optical code such as an QR code generated by the respective device or measurement site.

In addition to this or as an alternative, the authentication may comprise questioning the respective user which profile, especially measurement profile, should be used for the respective device to be connected or associated or a new profile should be generated.

Further additionally or further alternatively, the authentication may comprise using the type of the respective device to suggest possible profiles, especially measurement profiles, for the device to be connected or associated.

Again, with respect to the dongle, preferably the USB dongle, it is noted that the dongle may be configured to provide the respective key for the corresponding measurement site and/or for a particular profile, preferably a particular measurement profile, within the corresponding measurement site.

Figure 2:
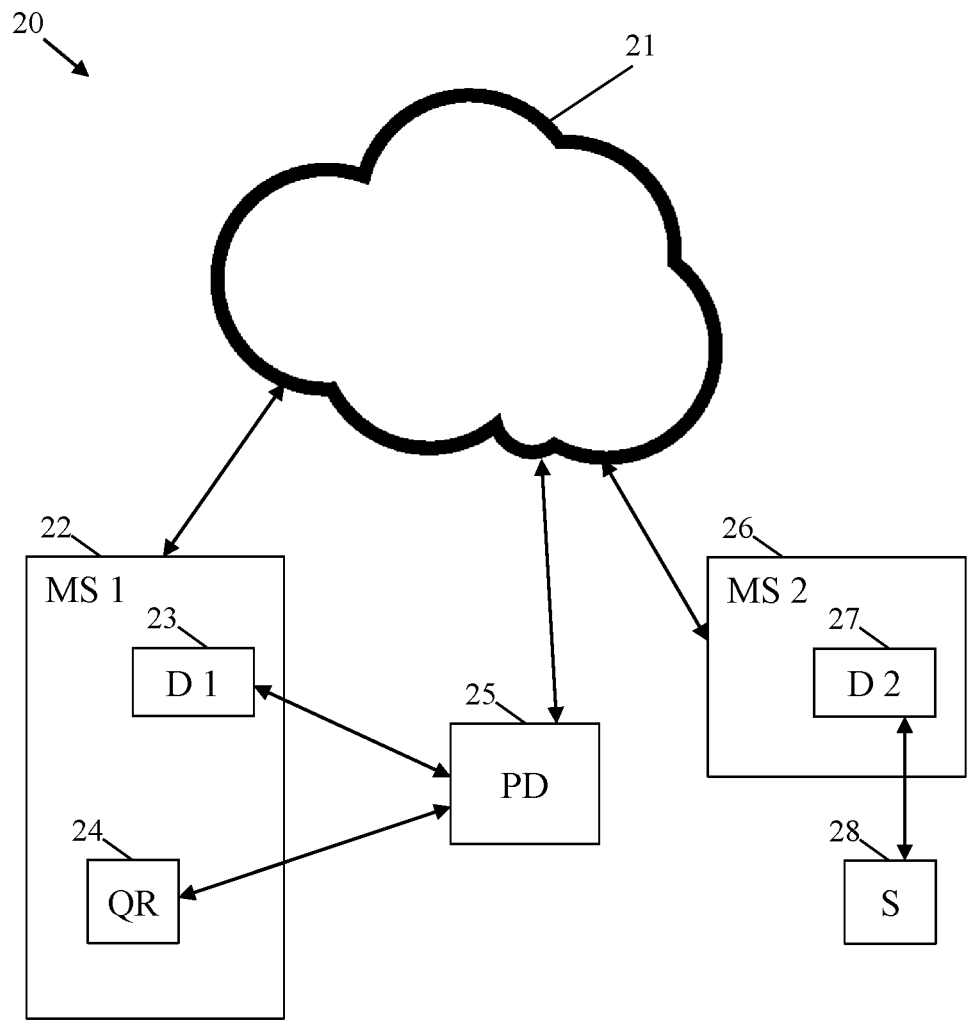
FIG. 2 shows a further exemplary embodiment with respect to the first aspect of the invention.

Now, with respect to FIG. 2, an exemplary embodiment of a cloud-based measurement platform 20 for the first aspect of the invention is shown.

According to FIG. 2, the cloud-based measurement platform 20 comprises a cloud service 21, a first measurement site 22 comprising a first measurement device 23 and a QR (Quick Response) code 24, a platform device 25, preferably a mobile device, more preferably a mobile phone, most preferably a smartphone, a second measurement site 26 comprising a second measurement device 27, and a dongle 28 preferably in the form of an USB stick.

In a first use case of identifying a device, especially a measurement device such as the device 23, with respect to a measurement site such as the measurement site 22, the platform device 25 may be configured to scan an optical code such as the QR code 24 of the measurement site 22 or of the device 23. In this context, said optical code may be a printed code or a code displayed on a display of the measurement site 22 or of the device 23, respectively. In addition to this, the platform device 25 may be configured to synchronize with the cloud service 21.

Additionally or alternatively, in a second use case of identifying a device, especially a measurement device such as the device 23, with respect to a measurement site such as the measurement site 22, the platform device 25 may be configured to use a wireless communication technique such as NFC (Near Field Communication) with respect to the measurement site 22 or the device 23 and to synchronize with the cloud service 21.

Furthermore, in a third use case of identifying a device, especially a measurement device such as the device 27, with respect to a measurement site such as the measurement site 26, an USB stick or dongle, respectively, such as the USB stick 28 is provided for the measurement site 26. In this context, the device 27 is configured to read the USB stick 28 and to connect itself with the respective cloud measurement site especially on the basis of the information and/or key read from the USB stick 28.

Again, with respect to the measurement cloud setup for coupling measurement device settings across multiple instruments and/or measurement sites, it is generally noted that the measurement cloud setup may comprise a management software and/or a cloud service that allows the user to define the instruments within measurement sites and/or measurement sites that are part of the respective coupling.

The measurement sites may be connected by a network especially comprising a network router and/or a server.

The management software and/or the cloud service may be configured to receive a setting from at least one of the measurement sites and/or to receive a setting from an user interface for the management software and/or for the cloud service.

Furthermore, the management software and/or the cloud service may be configured to send instructions to at least one of the coupled instruments and/or the coupled measurement sites especially in order to propose the respective setting.

Moreover, the coupled measurement instruments may be configured to receive and/or to implement the setting if possible and/or to provide the option to implement the setting. In this context, the option to implement the setting can be at cloud or cloud service, respectively, management software, or anywhere at measurement site.

It is further noted that the cloud or the cloud service, respectively, and/or the management software may be configured to compare the respective measurements of different devices under test. Advantageously, this allows for averaging over many devices under test and/or getting statistical information about device under test variation. Further advantageously, this can be particularly helpful if a reference device under test is used.

Furthermore, each measurement setup with respect to the multiple instruments and/or measurement sites may be configured to measure at least one device under test and to provide the corresponding results to the cloud or cloud service, respectively, and/or management software.

Moreover, it might be particularly advantageous if all members of coupling provided instructions to inform the cloud or the cloud service, respectively, and/or the management software of any setting changes. In this context, the current settings profile may be stored on the cloud or the cloud service, respectively. In addition to this, the cloud or the cloud service, respectively, may provide changes and instructions to the coupled sites.

It is further noted that at least one, preferably each, of the coupled measurement instruments may be configured to check if it is capable of taking a setting, especially a setting change, and to acknowledge or reject accordingly.

Furthermore, at least one of the measurement sites may be a reference measurement site that can make the changes. Additionally, the remaining measurement sites and/or instruments may only clone the changes from said reference measurement site.

Again, with respect to all members of the coupling, it is noted that at least one, preferably each, of the said members may be configured to provide an option on the respective measurement instruments, cloud, cloud service, management software, or any combination thereof for the user to accept or not to accept instruments.

It might be particularly advantageous if each measurement instrument in a measurement site has a role and any cloning of measurement settings goes to such instruments especially of said role in other sites.

It is noted that after predefining coupled measurement sites, some of which may take the changed settings, other will not. The changed settings may be taken from measurement site, cloud or cloud service, respectively, and/or management software. It is further noted that this especially allows for creating digital twins or a kind thereof.

Furthermore, on the basis of a changed setting and/or a measurement result of changed setting and/or capability information, the cloud or cloud service, respectively, and/or the measurement software may be configured to calculate a list of measurement sites where this setting has to be changed.

Moreover, the cloud or cloud service, respectively, and/or the management software may comprise capability information for each of the instruments at the at least one coupled measurement site. Additionally, the cloud or cloud service, respectively, and/or the management software may further be configured to know which sites can accept settings set by users.

It might be particularly advantageous if groups of setting types to be coupled are defined such that not all settings are propagated.

In addition to this or as an alternative, groups of settings may comprise defined offsets for specific settings, exemplarily a frequency offset.

With respect to the measurement sites and/or measurement instruments, it is noted that the measurement sites and/or measurement instruments may be configured to clone settings in real time. Additionally or alternatively, the measurement sites and/or measurement instruments may be configured to perform measurements simultaneously.

Figure 3:
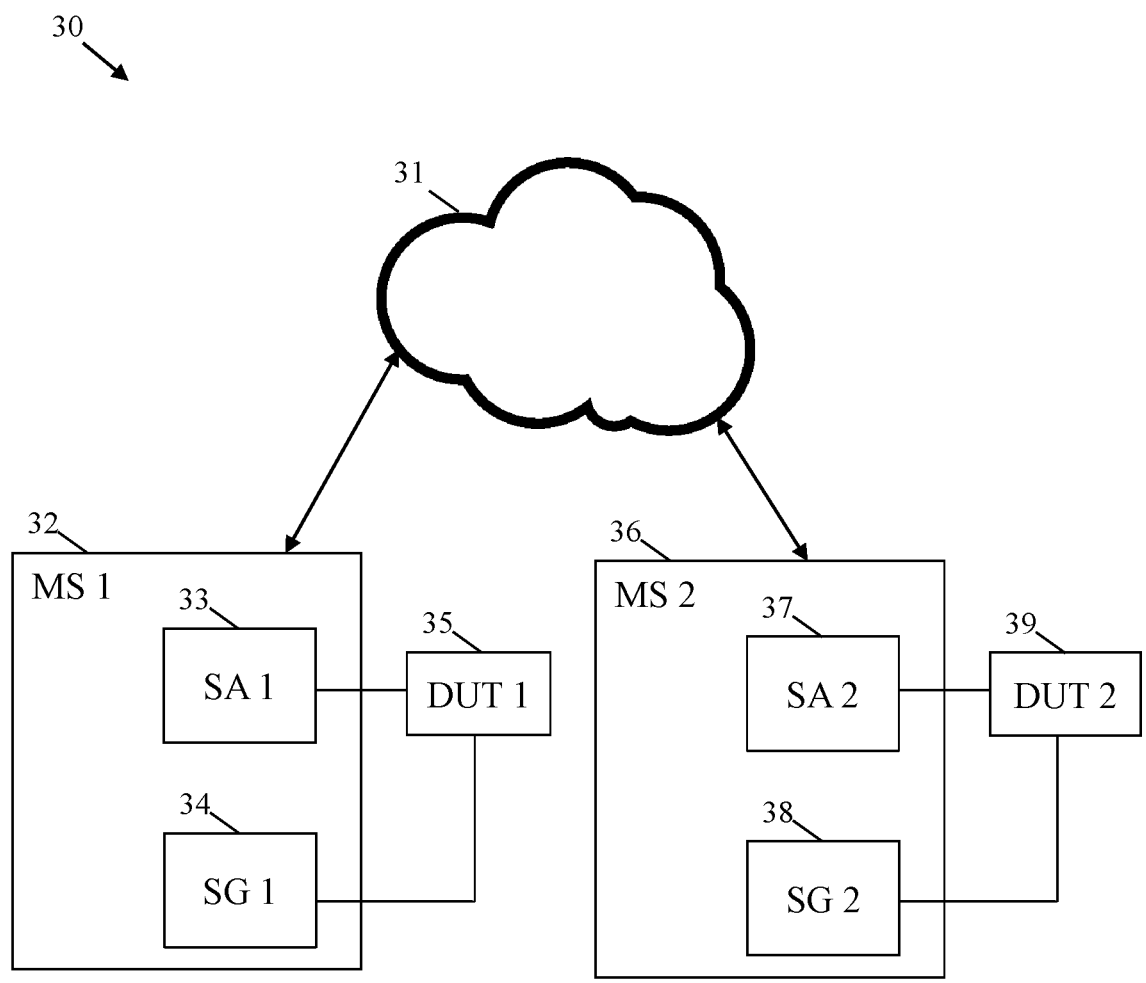
FIG. 3 shows a further exemplary embodiment of the first aspect of the invention.

Now, with respect to FIG. 3, a further exemplary embodiment 30 of the first aspect of the invention is depicted.

According to FIG. 3, the measurement cloud setup 30 comprises a cloud service 31, a first measurement site 32 comprising a first signal analyzer 33 and a first signal generator 34, a first device under test 35 connected to the first signal generator 34 and to the first signal analyzer 33, a second measurement site 36 comprising a second signal analyzer 37 and a second signal generator 38, and a second device under test 39 connected to the second signal generator 38 and the second signal analyzer 37.

In this context, the first measurement site 32 and the second measurement site 36 are coupled to each other with the aid of the cloud service 31.

Furthermore, the respective measurement results of the first signal analyzer 33 and the second signal analyzer 37 are compared to each other and/or to respective reference values. In addition to this or as an alternative, said respective measurement results may further be processed on the basis of at least one mathematical function. In this context, the cloud service 31 may be configured to perform said comparison and/or said calculation.

It is further noted that the corresponding result of said comparison and/or said calculation may be displayed on any display of the measurement instruments, especially the coupled measurement instruments.

In addition to this or as an alternative, the corresponding result of said comparison and/or said calculation may be displayed on a dashboard, preferably a cloud dashboard. In other words, the cloud service 31 may comprise a dashboard, wherein the dashboard may be configured to display said corresponding result.

Figure 4:
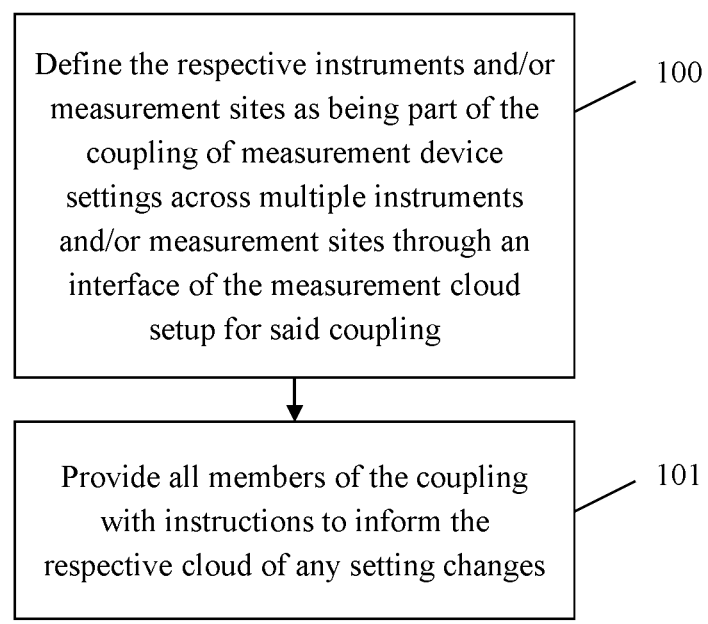
FIG. 4 shows a flow chart of an embodiment of the second aspect of the invention.

Finally, FIG. 4 shows a flow chart of an embodiment of the inventive method for handling a measurement cloud setup for coupling measurement device settings across multiple instruments and/or measurement sites. In a first step 100, the respective instruments and/or measurement sites are defined as being part of the coupling of measurement device settings across multiple instruments and/or measurement sites through an interface of the measurement cloud setup for said coupling. Then, in a second step 101, all members of the coupling are provided with instructions to inform the respective cloud of any setting changes.

In this context, it might be particularly advantageous if the respective instruments and/or measurement sites being part of the coupling are defined by a user.

It is further noted that the interface may comprise at least one of a controller, a management software, a cloud service, or any combination thereof.

Figure 5:
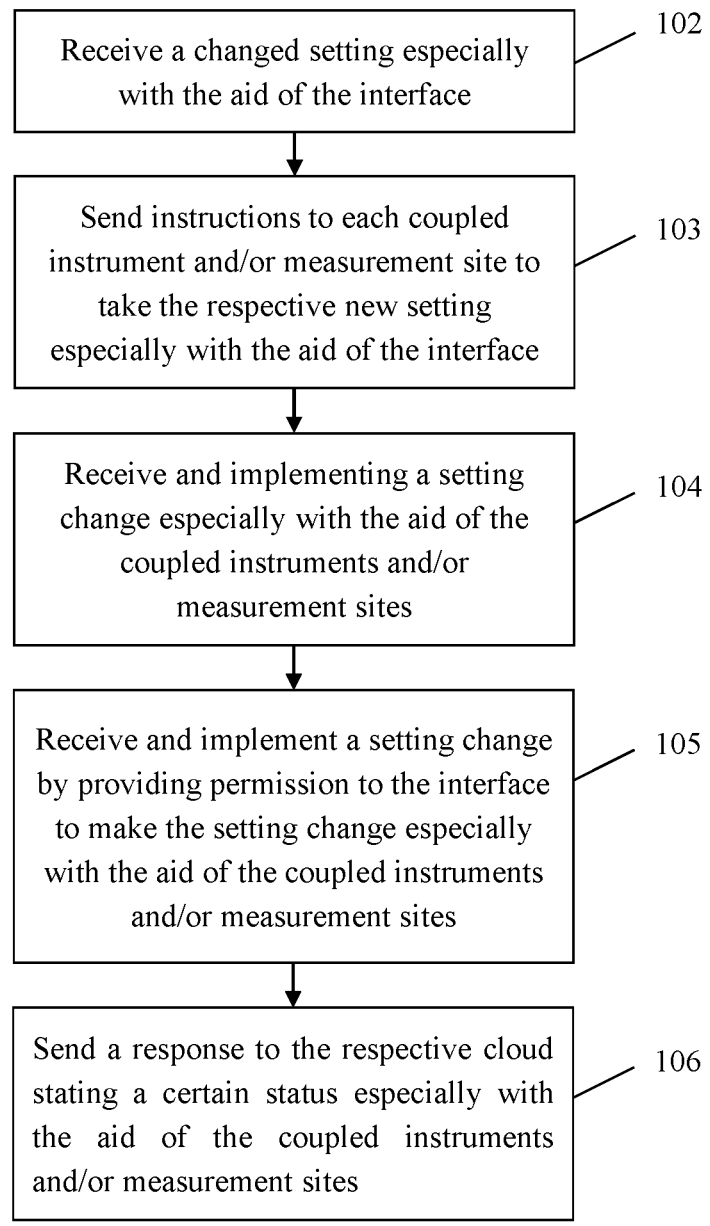
FIG. 5 shows a flow chart of a further embodiment of the second aspect of the invention.

Furthermore, in accordance with FIG. 5, the method may comprise the step of receiving a changed setting especially with the aid of the interface.

Moreover, the method may comprise the step of sending instructions to each coupled instrument and/or measurement site to take the respective new setting especially with the aid of the interface.

In addition to this or as an alternative, the method may comprise the step of receiving and implementing a setting change especially with the aid of the coupled instruments and/or measurement sites.

It is further noted that the method may comprise the step of receiving and implementing a setting change by providing permission to the interface to make the setting change especially with the aid of the coupled instruments and/or measurement sites.

Additionally or alternatively, the method may comprise the step of sending a response to the respective cloud stating a certain status especially with the aid of the coupled instruments and/or measurement sites.

In this context, it is noted that it might be particularly advantageous if the certain status comprises at least one of an okay, a not-okay, an acknowledgment, or a non-acknowledgment.

Figure 6:
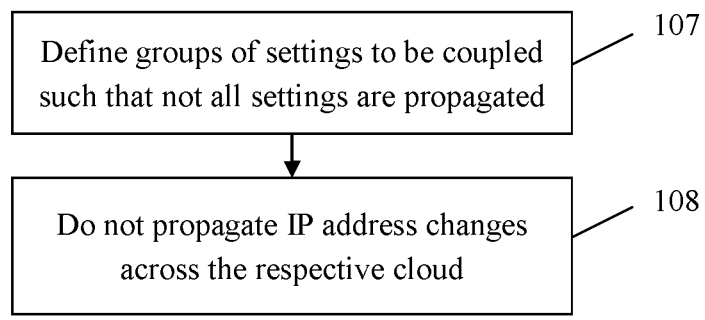
FIG. 6 shows a flow chart of a further embodiment of the second aspect of the invention.

Moreover, in accordance with FIG. 6, the method may further comprise the step defining groups of settings to be coupled such that not all settings are propagated.

It is further noted that IP address changes may not be propagated across the respective cloud. In other words, the method may further comprise the step of not propagating IP address changes across the respective cloud.

With respect to the groups of settings, it is noted that the groups of settings may especially comprise defined offsets for specific settings.

In this context, the defined offsets may especially comprise at least a frequency offset.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed:

1. A measurement cloud system for coupling measurement device settings across multiple instruments and measurement sites, the measurement cloud system comprising:
   said multiple measurement sites comprising said multiple instruments,
   an interface configured to define respective measurement sites and instruments as part of a coupling group,
   wherein the interface is further configured to receive a changed setting,
   wherein at least one of the coupled measurement sites in the coupling group takes changed settings, and at least one other coupled measurement site in the coupling group retains its existing settings,
   wherein the changed settings of the instruments of the at least one coupled measurement sites allows for creating digital twins, and
   wherein the measurement cloud system is configured to authenticate devices, wherein the respective authentication links the respective device with the corresponding measurement site and a desired profile of the respective device in the corresponding measurement site, wherein the desired profile is input by a user associated with the respective device.

2. The measurement cloud system according to claim 1, wherein the respective measurement sites being part of the coupling are defined by a user.

3. The measurement cloud system according to claim 1, wherein the interface comprises at least one of a controller, a management software, a cloud service, or any combination thereof.

4. The measurement cloud system according to claim 1, wherein all members of the coupling are provided with instructions to inform a respective cloud of any setting changes.

5. The measurement cloud system according claim 1, wherein the interface sends instructions to each coupled measurement site to take a respective new setting.

6. The measurement cloud system according to claim 1, wherein the coupled measurement sites receive and implement a setting change.

7. The measurement cloud system according to claim 1, wherein the coupled measurement sites receive and implement a setting change by providing permission to the interface to make the setting change.

8. The measurement cloud system according to claim 1, wherein the coupled measurement sites send a response to the respective cloud stating a certain status.

9. The measurement cloud system according to claim 8, wherein the certain status comprises at least one of an okay, a not-okay, an acknowledgment, or a non-acknowledgment.

10. The measurement cloud system according to claim 1, wherein groups of settings to be coupled are defined such that not all settings are propagated.

11. The measurement cloud system according to claim 10, wherein internet protocol address changes are not propagated across the respective cloud.

12. The measurement cloud system according claim 1, wherein the desired profile is determined by questioning the user.

13. The measurement cloud system according to claim 1, wherein the groups of settings comprise predefined offsets for specific settings of the instruments.

14. The measurement cloud system according claim 13, wherein the predefined offsets comprise at least a frequency offset.

15. A method for handling a measurement cloud system for coupling measurement device settings across multiple instruments at multiple measurement sites, the method comprising the step of:
   defining the respective measurement sites and instruments as part of a coupling group through an interface of the measurement cloud system,
   receiving a changed setting through the interface,
   wherein at least one of the coupled measurement sites takes changed settings, and at least one other coupled measurement site in the coupling group retains its existing settings,
   wherein the changed settings of the instruments of the at least one coupled measurement sites allows for creating digital twins, and
   wherein the measurement cloud system is configured to authenticate devices, wherein the respective authentication links the respective device with the corresponding measurement site and a desired profile of the respective device in the corresponding measurement site, wherein the desired profile is input by a user associated with the respective device.

16. The method according claim 15, wherein the desired profile is determined by questioning the user.

* * * * *